United States Patent
Culbertson et al.

(10) Patent No.: US 9,275,339 B2
(45) Date of Patent: Mar. 1, 2016

(54) SYSTEM AND METHOD FOR PROBABILISTIC NAME MATCHING

(71) Applicant: Raytheon Company, Waltham, MA (US)

(72) Inventors: Arthur R. Culbertson, Severna Park, MD (US); Premsagar Gazula, Ellicott City, MD (US)

(73) Assignee: Raytheon Company, Waltham, MA (US)

( * ) Notice: Subject to any disclaimer, the term of this patent is extended or adjusted under 35 U.S.C. 154(b) by 302 days.

(21) Appl. No.: 13/869,126

(22) Filed: Apr. 24, 2013

(65) Prior Publication Data

US 2013/0282645 A1    Oct. 24, 2013

Related U.S. Application Data

(60) Provisional application No. 61/637,484, filed on Apr. 24, 2012.

(51) Int. Cl.

| | |
|---|---|
| G10L 15/18 | (2013.01) |
| G06F 17/30 | (2006.01) |
| G06N 7/00 | (2006.01) |
| G06F 17/27 | (2006.01) |
| G06K 9/62 | (2006.01) |

(52) U.S. Cl.
CPC .............. *G06N 7/005* (2013.01); *G06F 17/273* (2013.01); *G06F 17/278* (2013.01); *G06F 17/2755* (2013.01); *G06F 17/30* (2013.01); *G06K 9/6277* (2013.01); *G10L 15/18* (2013.01)

(58) Field of Classification Search
None
See application file for complete search history.

(56) References Cited

PUBLICATIONS

Pei, A Comparative Study of Record Matching Algorithms European Master in Informatics (EuMI) Media Informatics RWTH Aachen, Germany and University of Edinburgh, Scotland [online], 2008 [retrieved on Apr. 3, 2015]. Retrieved from the Internet<URL:http://www.google.com/urlsa=t&rct=j&q=&esrc=s&frm=1&source=web&cd=4&cad=rja&uact=8&ved=0CDMQFjAD>.*

* cited by examiner

*Primary Examiner* — Jeffrey A Gaffin
*Assistant Examiner* — Nathan Brown, Jr.
(74) *Attorney, Agent, or Firm* — Schwegman Lundberg & Woessner, P.A.

(57) ABSTRACT

Generally discussed herein are systems and methods for probabilistic name matching. In one or more embodiments a method can include determining a first set of possible intended names as a function of a first name, determining a second set of possible intended names for each name in a set of names in a name variant database, and probabilistically matching a name from the first set of possible intended names to a name from the second set of possible intended names. Probabilistically matching can include determining a weight associated with typing the first name but intending to type another name in the first set of possible intended names and determining the probability of typing a name in the set of names in the name variant database but intending to type a name from the second set of possible intended names.

17 Claims, 6 Drawing Sheets

SYSTEM AND METHOD FOR PROBABILISTIC NAME MATCHING

RELATED APPLICATION

This application claims priority to U.S. Provisional Application Ser. No. 61/637,484 (entitled "System and Method for Probabilistic Name Matching", filed Apr. 24, 2012) which is incorporated herein by reference in its entirety.

GOVERNMENT RIGHTS

This invention was made with United States Government support under Contract Number DOJ-FBI-2007-C-2492. The United States Government has certain rights in this invention.

BACKGROUND

Word matching algorithms can use a string similarity model that is a function of an edit distance, n-gram, longest common substring, or skip-gram. The edit distance is defined as the smallest number of edit operations (e.g., insertions, deletions, substitutions, or transpositions) to transform one string into another. The n-gram of a string is all the overlapping n-character sequences in the string. There are several different n-gram similarity measures. A simple measure is the count of the total number of n-grams two strings have in common. Positional n-grams are an extension to n-grams that add positional information (e.g., location of an n-gram within a string) and can match common n-grams that are within a specified distance of each other. The longest common substring approach can repeatedly find and remove the longest common substring in two compared strings. A similarity measure can be calculated by dividing the total length of the common substrings by the minimum, maximum, or average lengths of the two original strings. Skip-grams ("s-grams") can allow n-grams to be formed from both adjacent and non-adjacent characters of strings. Skip-grams have been assisted in overcoming cross-lingual spelling variation as well as monolingual morphological variation.

Word matching algorithms can use a phonetic coding technique. Phonetic coding techniques attempt to convert a name string into a code according to how a name is pronounced. The combination of string similarity and phonetic coding has proven to be relatively effective in spell checkers. For example, a spell-checker can match words that have a same phonetic code and are within a specified edit distance.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Embodiments discussed herein can address one or more problems associated with searching databases for person names or words where there can be one or more errors in the query name or one or more errors in the names in the database being searched. Name searching can include an approximate name matching capability that can overcome orthographic, phonetic, and typographic errors. Approximate name matching can handle a first name or a last name, whether singular or compound (e.g., hyphenated), irrespective of nationality. Approximate name matching can include nickname support. To help avoid false negatives a name matching algorithm can find important phonetic and orthographic outliers while not sacrificing precision.

One key insight embodied in the Probabilistic Name Matching (PNM) systems and methods disclosed herein is that the goal of finding a named person of interest can be achieved by considering the probability that the name the user intended to search for (e.g., before possible transcription errors) is the same name that was intended for entry into the database (e.g., before possible transcription errors). This is in contrast to approaches that only consider the direct string or phonetic similarity of the query name entered with the names entered into the database. One operational difference between PNM and traditional name matching approaches is that PNM involves expanding both the query name and the database names with a set of likely or possible intended names and matching these likely intended names rather than relying only on matching the observed query and database names directly.

Embodiments of PNM can include one or more of the following technical components:

1. Model of the transcription error process—a model of the transcription process can help overcome the transcription errors and diverse types of errors encountered with a transcription process. PNM can use Hidden Markov Modeling (HMM) to construct a model of the way people make cognitive and keystroke execution errors during the transcription process. The use of HMM to model transcription errors was motivated by the observation that errors in the transcription process arising from cognitive mistakes can be modeled as a stochastic Markov process, whose states are hidden behind a keystroke error probability distribution related to the layout of the QWERTY keyboard. Models can be constructed using statistical analysis of the error rates occurring in the actual operational name data.

2. A name variant database (e.g., a comprehensive name variant database)—A PNM system or method can include a database of possible intended names, along with their probability of occurrence, such as with respect to some geographically defined population. This database can be known as a Name Variant (NV) database. The NV database can be generated using a name morphology induction approach that is based on Multiple String Alignment (MSA) technology. MSA has been a focus of bioinformatics for many years, where it can be used as a way of arranging DNA, RNA, or protein sequences to help identify regions of similarity. A goal of MSA in the PNM context is the identification of units of regularity that exist in orthographically and phonetically similar sets of names (referred to as alignment sets) so that these units can be combined to create name variants not present in the original alignment sets. These name variants generated in this way can include both real names, common misspellings, or nick names.

3. A probability (e.g., Bayesian) theoretic framework—A PNM can use HMM in combination with a name variant prior probability contained in an NV database to support probabilistic reasoning about the intended names before or after transcription errors. These likely intended names, along with their probabilities can be added to the database content through content or query expansion. A set of intended NV names with broad orthographic and phonetic similarity to content names along with their associated probabilities can be stored and used to determine if an entered or stored name is misspelled.

4. Query expansion—Query expansion can include a weighted set of intended GNV names with narrow orthographic and phonetic similarity to the query name. Weighting can be a function of string similarity to the query name, such as a function of a Jaro-Winkler distance.

5. Name match scoring—Name matches can occur when the query expansion and content expansion intersect. A match score computation can consider probabilities of the content expansion names, weights of query expansion names, or amount of intersection (e.g., overlap) between the query and content expansions.

The following are some possible features of PNM:

1. Changing the focus of approximate name matching from string and phonetic similarity of the observed query and database names to the probabilistic problem of determining the likelihood that the name the user intended to enter into a query is the same name that the data entry person intended to enter into the database.

2. Using HMM to model how people make cognitive and keystroke execution errors during the transcription process.

3. Using multiple string alignment to predict name morphology and generate name variants from sets of orthographically or phonetically similar names.

Current approaches to approximate name searches can rely on spell checking technology (e.g., Jazzy, which is a set of Application Programming Interfaces (APIs) that allow a user to add spell checking functionality to an application) or query expansion. Queries can be reformulated to include a set of candidate names that the spell-checker determines to be similar to the query term (e.g., search term). A dictionary that the spell-checker uses to look up the words can include common misspellings of words. One drawback of such a system is that minor misspellings can be so prolific that query expansions can become unmanageably large (e.g., even with the spell-checker set to minimum edit distance thresholds). The query expansion can then be limited (e.g., arbitrarily) to a specified number of terms (e.g., ten). In some examples, there may be no basis for choosing which terms are retained and which terms are discarded when the expansion is limited. Recall can be increased (e.g., maximized) by using name frequency as a basis for choosing which terms to retain. Such a configuration can help ensure that the most frequently occurring names in the original expansion are returned.

Another drawback to string similarity and phonetic coding is that they provide only an indirect answer to the question of "How likely is it that the name the user intended to enter into a query is the same name that the data entry person intended to enter into the data records?" To answer this question more directly an apparatus or method can model how people make errors, such as cognitive (e.g., spelling) and keystroke errors.

The PNM can be based on a noisy channel model that assumes the correct spelling of a name can be garbled passing through a communication channel (e.g., the correctly spelled name has noise added to it on the way to the keyboard). Such a model can include a channel and a source. The channel model can take the probability of cognitive and keystroke execution errors when typing a particular name into consideration and the source model can take a probability of choosing a name to type into consideration. In one or more embodiments, the channel and source models can be created for each of the names in a census (e.g., the United States Census data). In one or more embodiments, the channel and source models can include an NV database that includes data derived from the census, such by using an MSA process to produce a more comprehensive name probability distribution. Separate channel models can be created for transcription and spelling, such as to account for differences between the types of errors introduced during data entry by submitting agencies and query entry by users. Source models can use census of NV database name frequency data, such as in deciding which names are likely to produce an observed spelling.

A noisy channel model can be modeled using Bayesian inference. The likelihood that a user intended to type a word N given an observed word O can be modeled by $P(N|O)$ (e.g., the probability that the user types N given the user observing O or the posterior probability of the hypothesis). Using Bayes' theorem (i.e. $(P(O|N)*P(N))/P(O)$) and N's independence from O, $P(N|O)=P(O|N)*P(N)$, where $P(O|N)$ is the channel model and $P(N)$ is the source model. Given an HMM that describes how errors can be introduced into N, the observation likelihood can be rewritten as $P(N|O)=P(O|HMM_N)*P(N)$.

A person can choose a word to type according to the probability distribution $P(N)$. Then the person attempts to type name N, but the noisy channel induces the person to type O instead, according to the probability distribution $P(O|N)$. One or more HMMs can be used to model how errors are introduced in transcribing and spelling names. The forward algorithm (e.g., substituting one or more HMMs for N in $P(O|N)$) can be used to compute the probability of seeing) given the one or more HMMs.

An HMM can be used to describe a two-stage stochastic process. The first stage includes a discrete stochastic process which probabilistically describes state transitions within a discrete finite space. Such state transitions in the finite space can be visualized as a finite state automation with edges between pairs of states which are labeled with transition probabilities. The process obeys the Markov property (e.g., that a state at any given time is only dependent upon the previous state). In the second stage every point in time has an output with a probability distribution that is only dependent upon the current state and not on any previous states. The sequence of outputs is the portion of the model that is observed. The underlying state sequence can remain unobserved (it is "hidden"). In spelling a word, the states of an HMM can correspond to a user's cognitive commitment to typing a particular character of that name. A series of cognitive transitions can occur as a person goes through the process of typing a name. The corresponding state transition probabilities can be determined by cognitive error models. Although the underlying cognitive state may not be directly observable, the character generated from the cognitive state trying to press a particular key can be observed. A keyboard error model (e.g., a portion of the HMM) can specify the probabilistic correlation between the actual character typed and the character intended by a cognitive state.

In the context of transcribing and spelling words, a user can go through a series of hidden cognitive state transitions. The observed word can be determined by a probabilistic correlation between characters intended by cognitive states and the actual characters generated from those cognitive states. A cognitive model of transcription can be a function of probabilities of skipping, repeating, or transposing one or more characters (e.g., as determined from the actual error rates for names in an operational database). A cognitive model of spelling can be based on probabilities derived from a set of names that are orthographically or phonetically similar to the intended name, such as by using MSA. A keyboard error model can be used to determine an observation probability of typing a character intended by a cognitive state (e.g., as determined from an actual keystroke error rate for names in an operational database).

A keyboard error model can use a Pythagorean-type key distance metric to determine the probability of hitting a key given an intended key. For example, consider a QWERTY keyboard and a situation where a user intended to type the letter "n", but typed the letter "w" instead. The distance between the two letters can be approximated as 4.47 (assuming that the distance between successive keys is the same and assumed to be a distance of 1). The distance is the vertical distance between the two letters squared plus the horizontal distance between two letters squared, square-rooted. In the case of "w" and "n", the horizontal distance is four because the column containing "n" is four columns to the right of the column containing "w", and the vertical distance is two because the row containing "n" is two rows below the row containing "w". Thus, the distance between "w" and "n" on a QWERTY keyboard can be approximated as the square root of $(4^2+2^2)$, which is 4.47.

It can be assumed that the probability of hitting a key that is a distance d from an intended key decreases exponentially as d increases. Also, empirical evidence suggests that the probability of an error occurring by hitting a key horizontal to an intended key is greater than the probability of hitting a key vertical to an intended key. Some empirical evidence suggests that it is two to three times more likely to have a horizontal transcription error than it is to have a vertical transcription error.

Transcription error statistics can be gathered and used in an error model. For example, in a study that considered about one hundred nineteen million names from the FBI's National Data Exchange (N-DEx) database, it was determined that about 99.6% of unique names are recognized in the N-DEx database (as compared to a U.S. Census from the year 2000), about 91% of all names are recognized as compared to the U.S. Census, and the name distribution (e.g., the percentage of the total names that are a given name) is similar to the distribution in the U.S. Census.

In a study that looked at a random sample of about 5% of the names in the N-DEx database, it was determined that the transcription errors in the names entered in the N-DEx database includes an error in about 2% of all the name entries. Of those 2%, about 36% were due to skipping a letter, about 7% were due to repeating a letter, about 10% were due to transposing a letter, and about 47% were due to keystroke errors in the erroneous entry.

An MSA process can help uncover multi-grapheme/phoneme units that represent the phonetic and orthographic building blocks used in a cognitive process of spelling a word (e.g., a word unfamiliar to the entity typing the name). Gaps can be inserted into strings so as to align common substrings using assigned character mismatch or character-to-gap penalties. Probabilities associated with the spelling sequences generated from an alignment can be a function of character frequencies at relative positions obtained by skipping gaps.

Apparatuses and techniques for implementing probabilistic name matching are now discussed with reference to the figures.

Figure 1:
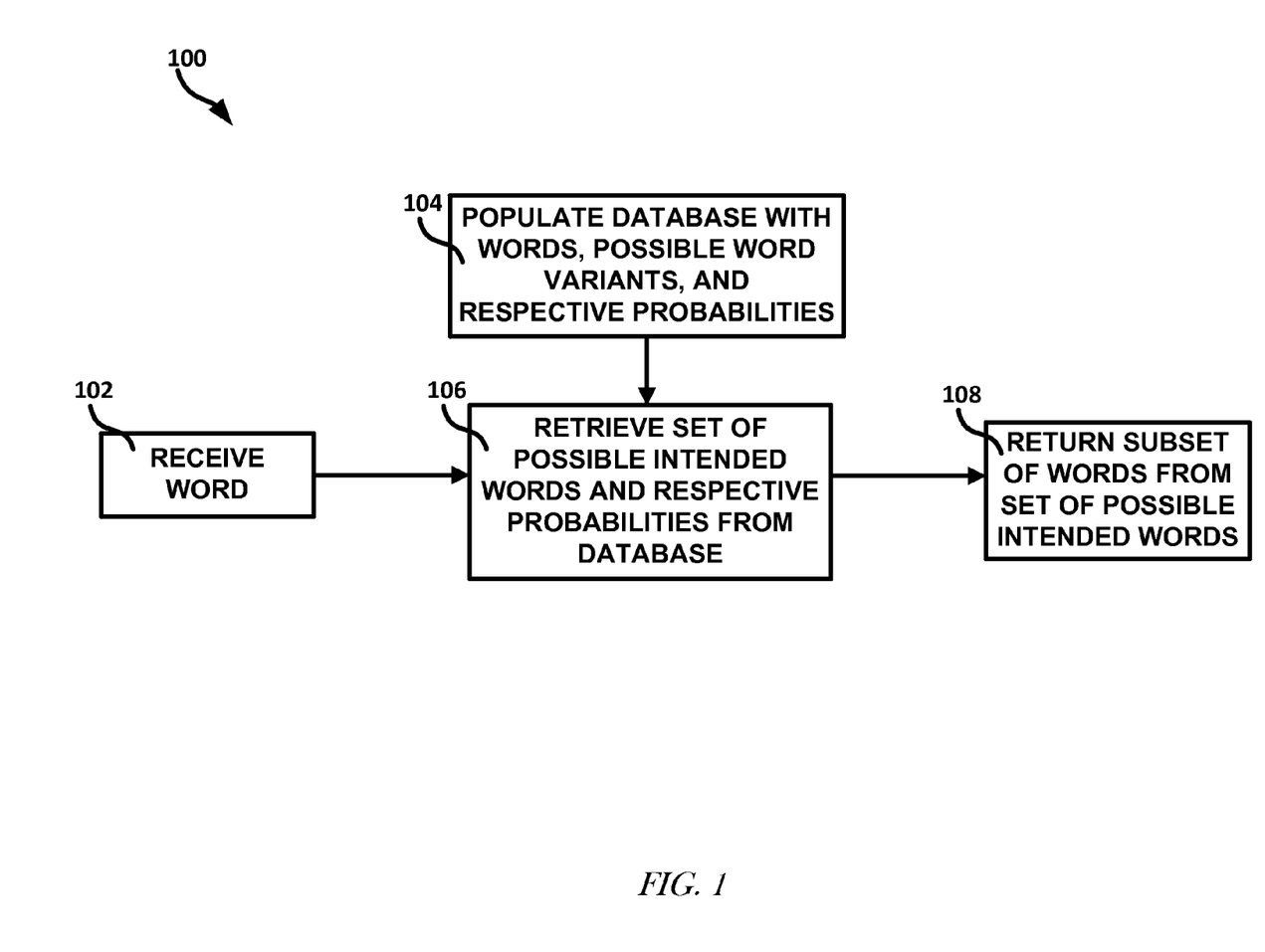
FIG. 1 is a flow diagram of an example of a technique for probabilistic name matching.

FIG. 1 is a flow diagram of an example of a technique 100 for probabilistic name matching. At 102, a word (e.g., a set or string of characters, such as a proper name, nickname, verb, noun, etc.) can be received, such as from a user typing the word into a query.

At 104, a database can be populated with words, possible word variants, and respective probabilities or weights. The possible word variants can include phonetically similar words, orthographically similar words, or words that are similar to the received word, but include one or more transcription errors. The phonetically similar words can be created using a phonetic matching algorithm, such as Soundex, Metaphone, Match Rating, Craverphone, or variants thereof, among others. The phonetically similar words can be created using a spell-checking algorithm (e.g., Jazzy). The words that include one or more transcription errors or orthographically similar words can be created using an MSA algorithm. The respective probabilities of a user intending to type a word but typing a different word can be determined using an HMM that can include a cognitive model of transcription errors and a keyboard error model. The cognitive model can include probabilities of skipping, repeating, or transposing characters in the observed word that the user is trying to type. The keyboard error model can model the situation where a user intends to type one letter, but types another letter instead.

At 106, a set of possible intended words and respective probabilities can be retrieved from the database. The possible intended words and respective probabilities can be filtered to include a specified number of intended words. For example, a user can specify that they only want to see the ten words from the set of possible intended words that are most likely to be what the user intended to type. At 108, a subset of the possible intended words (e.g., a portion or all of the set of possible intended words) can be returned. In the example where a user specified that they want to see only the ten most likely words, the ten words with the highest ranks (e.g., as determined by a probabilistic matching module) can be returned.

Figure 2:
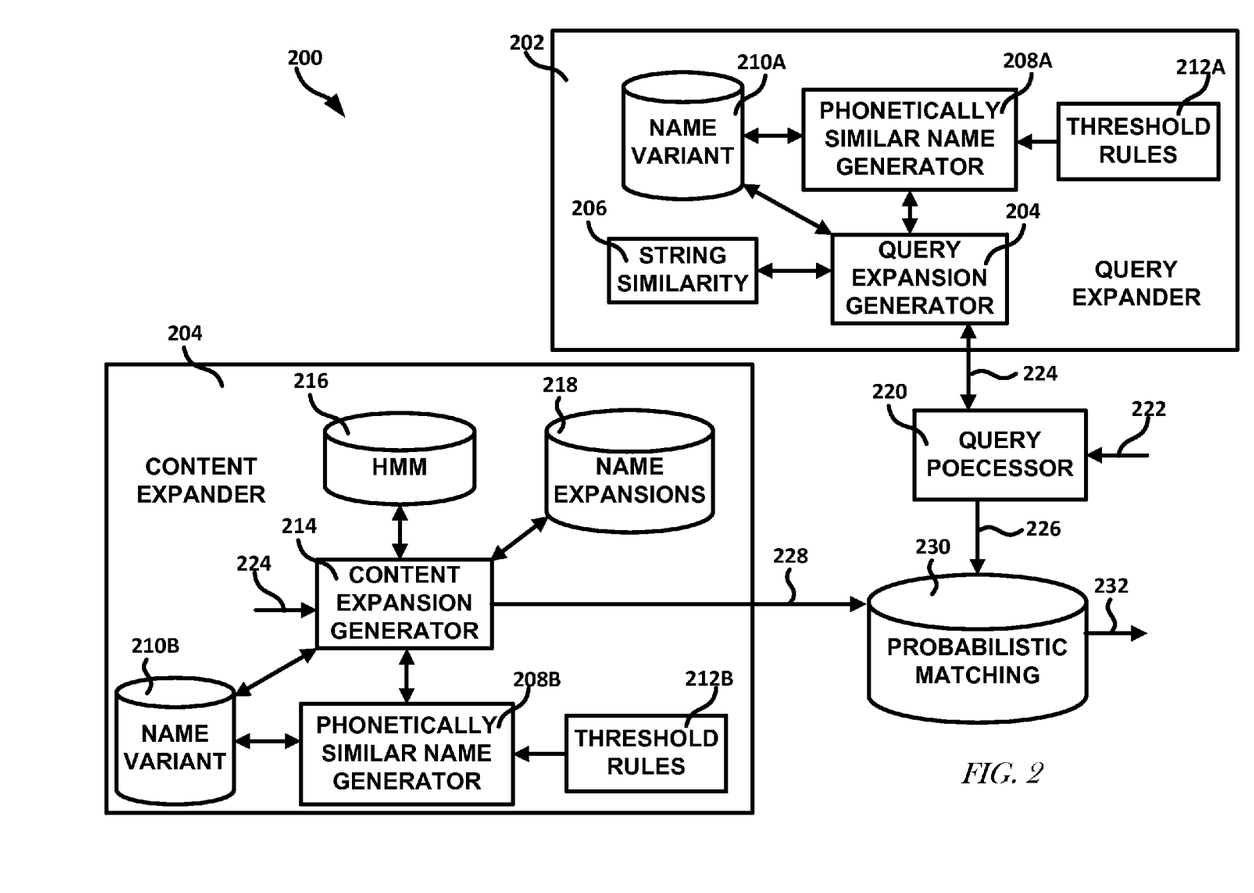
FIG. 2 is a logical block diagram of an example of a system for probabilistic name matching.

FIG. 2 is a logical block diagram of an example of a system 200 configured for probabilistic name matching. The system 200 can include a query expander 202 and a content expander 204 coupled to a probabilistic matching module 230. The query expander 202 can include a query expansion generator 204 coupled to a string similarity module 206 and a phonetically similar name generator module 208A. The phonetically similar name generator module 208A can be coupled to a name variant database 210A and a threshold rules module 212A. The content expander 204 can include a content expansion generator 214 coupled to a name variant database 210B, an HMM module 216, a phonetically similar name generator 208B, and a name expansions module 218. The phonetically similar name generator module 208B can be coupled to a threshold rules module 212B.

The query expansion generator 204 can receive a word, through line 224, typed by a user and submitted to a query processor 220, such as through line 222. The query expansion generator 204 can be coupled to the phonetically similar name generator 208A. The phonetically similar name generator 208A can receive a word from the query expansion generator 204 and produce words substantially phonetically similar to the received word. Substantially phonetically similar can mean that the word produced by the phonetically similar name generator 208A is within a specified threshold of similarity, such as can be defined in the threshold rules module 212A. The phonetically similar name generator 208A can use a spell checker, such as Jazzy, to receive a word and produce a set of possible intended words to return to the query expansion generator. The phonetically similar name generator 208A can filter the names created to remove words not substantially similar to the received word on line 224. The phonetically similar name generator 208A can produce names similar to a name retrieved from the name variant database 210A that is determined to be substantially similar to a received name.

The string similarity module 206 can compute a distance between a given word and a word that is determined to be substantially phonetically similar to the given word. In one or more embodiments, the string similarity module can receive two words (e.g., a word as typed by a user in a query and a word similar to the typed word as determined by the phonetically similar name generator and the threshold rules module 212A) and compute a Jaro-Winkler distance between the two words. The string similarity module 206 can compute a weight for a word received. The weight can be determined as a function of a distance between the received word and the typed word.

The name variant database 210A can include a plurality of words that are intended to be an exhaustive list of possible valid words that can be typed into a query. In one or more embodiments, the name variant database 210A includes a list of all names listed in a Census and associated with each name is an associated unconditional probability computed as the number of occurrences of the name in the Census divided by the total number of names in the Census. The name variant database 210A can include one or more weights computed by the string similarity modules and associated with one or more words in the name variant database 210A.

The threshold rules module 212A can store rules including a threshold phonetic similarity. The threshold phonetic similarity can indicate how similar two words need to sound in order to be included in a list of possible intended words.

The content expander 204 can include a content expansion generator 214 that can manage a process of creating a list of possible intended content words. The list of possible intended words from the content expander can be an expansion of a name entered in a database, with possible typographical errors, such as by a data entry person. The content expansion generator can receive a word, on line 224, and produce a set of possible intended words as a function of the word. The set of possible intended words can be sent to the probabilistic matching module 230, such as on line 228.

The content expansion generator can be coupled to an HMM module 216. The HMM module 216 can be configured to simulate a process of an entity typing a word, but intending to type a different word. The HMM module 216 can simulate cognitive errors or transcription errors and determine a probability of a user typing a first word but intending to type a second word.

The content expansion generator 214 can be coupled to a name expansions module 218. The name expansion module 218 can be configured to perform MSA on a name received or stored therein.

Similar to the query expansion generator, the content expansion generator 214 can be coupled to a name variant database 210B and a phonetically similar name generator 208B, and the phonetically similar name generator 208B can be coupled to a threshold rules module 212B. The name variant database 210B can be the same as or similar to the name variant database 210A, the phonetically similar name generator 208B can be the same as or similar to the phonetically similar name generator 208A, and the threshold rules module 212B can be the same as or similar to the threshold rules module 212A.

The probabilistic matching module 230 can be configured to match a name from a first set of possible intended names, such as from the query expander 202, to a name from the second set of possible intended names, such as from the content expander 204, determine a first probability of a first user typing the first name but intending to type another name in the first set of possible intended names, and determine a second probability of a second user typing a name in the set of names but intending to type a name from the second set of possible intended names.

The probabilistic matching module 230 can be configured to determine a rank for each name in the second set of possible intended names by at least in part, determining a probability of an intersection between the first set of possible intended names and a third set of possible names phonetically similar to a name from the second set of possible intended names. The probabilistic matching module 230 can be configured to sum a joint probability of a conditional probability of the first name given an intended name from the first set of possible intended names or the second set of possible intended names, a conditional probability of a name from the second set of possible intended names given the intended name, and the unconditional probability of the intended name.

Figure 3:
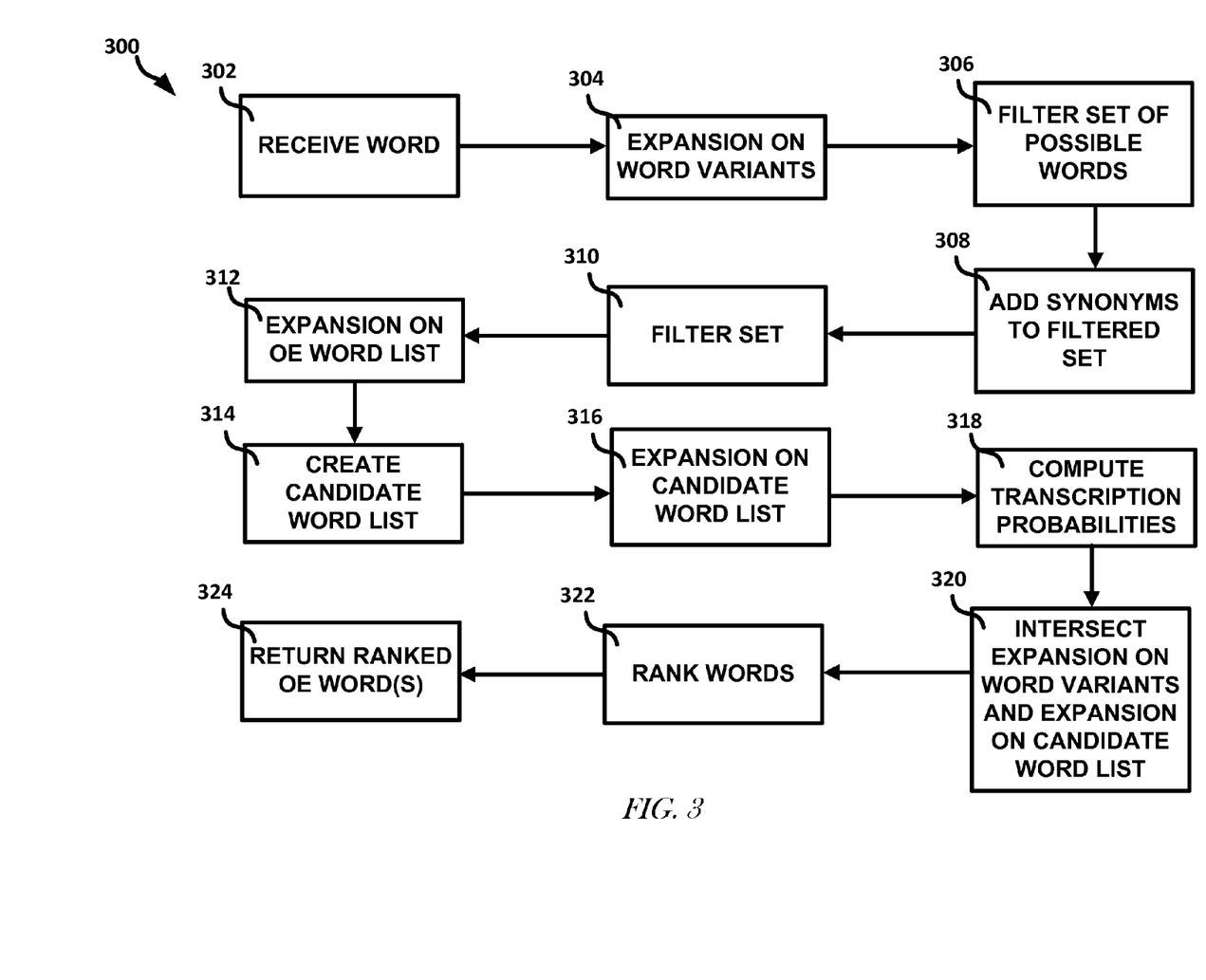
FIG. 3 is a flow diagram of an example of a technique for probabilistic name matching.

FIG. 3 shows a flow diagram of an example of a technique 300 for probabilistic word matching. At 302, a word (e.g., name) can be received, such as through a user submitting a query to the query processor 220. At 304, a set of possible intended words can be retrieved from a name variant database 210A or 210B, and each word in a set of words in the name variant database 210A or 210B associated with the received word can be expanded, such as by using name expansions module 218 (e.g., name expansions database). The expansion can be accomplished by using a spell checker, phonetic matching technique, or orthography matching technique. For example, Jazzy could be used to create the expanded word set. The word variant database can include MSA listed variants on words.

At 306, the expanded word set can be filtered to remove obviously erroneous results returned from the expansion. For example, if a user types in "Smyth" and the name variant database 210 expansion returns "Mythos", "Mythos" can be removed from the list. The filtering can be accomplished by using a phonetic matching algorithm and removing words that do not reach a defined threshold of phonetic similarity or other measure of word similarity. At 308, synonyms, such as nicknames or thesaurus equivalents to words, can be added to the list of words created.

At 310, the list of words can be filtered, such as by filtering gender specific words, if specified. At 312, words sufficiently similar to the words in the list created thus far (e.g., content words in an Operations Environment (OE) database or other database or memory) can be expanded upon. At 314, this list can be filtered to create a candidate word list. At 316, each word in the candidate word list can be expanded upon. The list created from the expansion can be filtered. At 318, transcription probabilities can be computed, such as by using an HMM, keyboard error model, or prior empirically known statistical probabilities. At 320, an intersection of the expansion on word variants (from the result of 304) and the expansion on the candidate word list (from the result of 316) can be determined for each word on the candidate word list.

At 322, each candidate word can be ranked, such as by determining an amount of intersection between the expanded candidate word list and the query word variant lists. If a candidate word list has a greater intersection it can be ranked higher than a candidate word that has a lesser intersection. At 324, the ranked candidate words, or a subset of the ranked candidate words can be returned.

Figure 4:
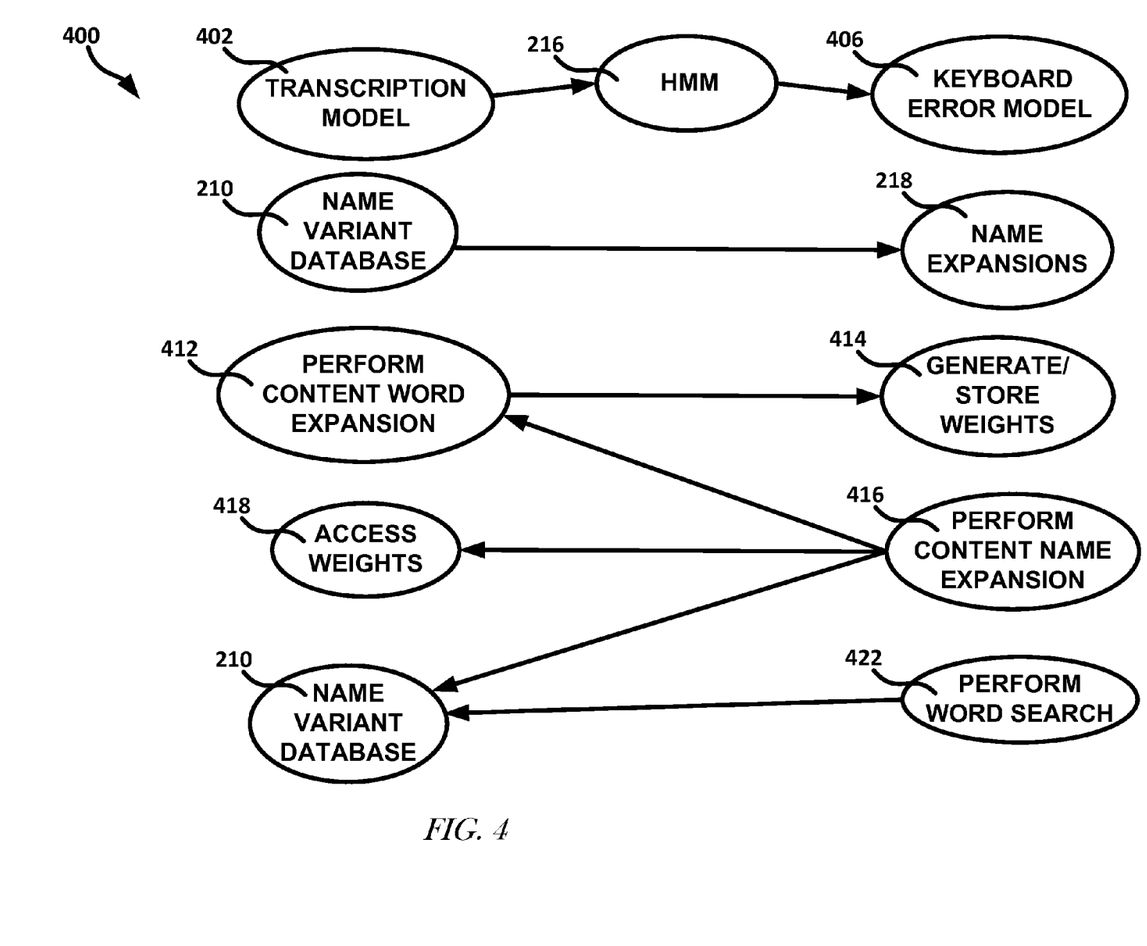
FIG. 4 is a diagram of examples of use cases for elements of a probabilistic name matching system.

FIG. 4 illustrates a flow diagram of examples of various use cases 400 for probabilistic name matching. A transcription model 402 can be generated that includes an HMM module 216, which can include a cognitive error model or a keyboard error model 406. A name variant database 210 can be generated and MSA name expansions 218 can be created from name variant database 210 content or from another content word database, such as an OE database populated through data entry. A content word expansion 416 can be performed by accessing the name variant database 210, weights or probabilities 418 associated with the likelihood that a user typed one word but intended to type another word, and performing a content word expansion 412. A content word, as used herein, means a word stored in a system that is being queried. Note that the content word need not appear in the name variant database 210. The content word can include one or more typographical errors not accounted for in the name variant database 210 or the content word can be a unique word without typographical errors that is not stored in the name variant database 210. The content word expansion 412 can generate or store ranks, weights, or probabilities associated with a given word 414 in an expansion.

Figure 5:
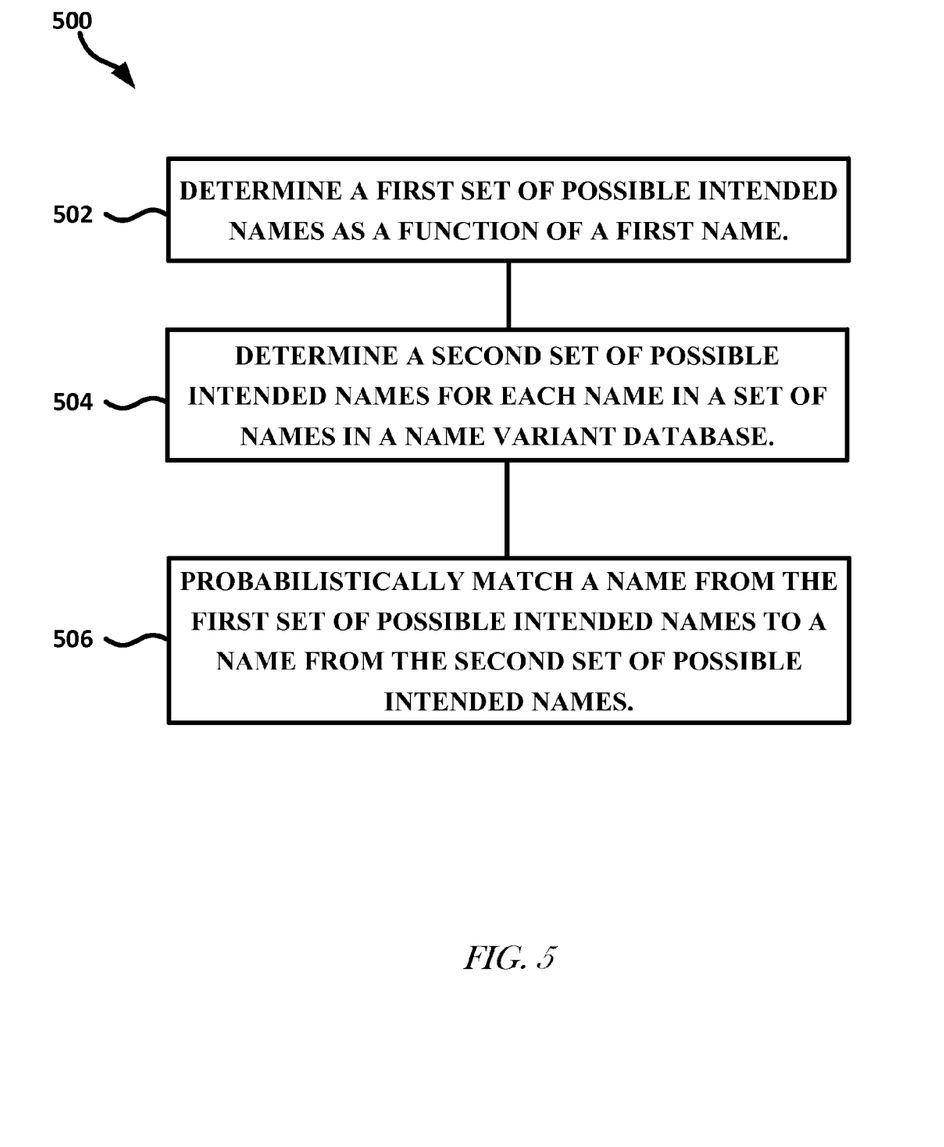
FIG. 5 is a block diagram of an example of a technique for probabilistic name matching.

FIG. 5 illustrates a block diagram of an example of a technique 500 for performing PNM. At 502, a first set of possible intended names can be determined as a function of a first name. The first name can be received from an entity typing the first name into a computer. Determining the first set of possible intended names can include using a phonetic matching algorithm to determine names phonetically similar to the first name. At 504, a second set of possible intended names for each name in a set of names in a name variant database can be determined. Determining the second set of possible intended names for each name in the set of names in the name variant database can include using MSA to at least partially determine the second set of possible intended names.

At 506, a name from the first set of possible intended names can be probabilistically matched to a name from second set of possible intended names. Probabilistically matching can include determining a probability of a first user typing the first name but intending to type another name in the first set of possible intended names and determining the probability of a second user typing a name in the set of names in the name variant database but intending to type a name from the second set of possible intended names. The first user and the second user can be the same entity. Determining the probability of the second user typing the second name but intending to type another name in the second set of possible intended names can include using a hidden Markov model to model a cognitive and transcription error process associated with a user typing the second name.

The technique 500 can include ranking possible matches by at least in part, determining a probability of an intersection between the first set of possible intended names and a third set of possible names phonetically similar to a name from the second set of possible intended names. Determining the probability of the intersection includes summing a joint probability of a conditional probability of the first name given an intended name from the first set of possible intended names or the second set of possible intended names, a conditional probability of a name from the second set of possible intended names given the intended name, and the unconditional probability of the intended name. The unconditional probability can be the total number of times an intended word or name appears in the name variant database 210 divided by the total number of words or names in the name variant database 210. The technique 500 can include filtering the names phonetically similar to the first name to remove gender specific names of a gender opposite a gender of the first name.

Figure 6:
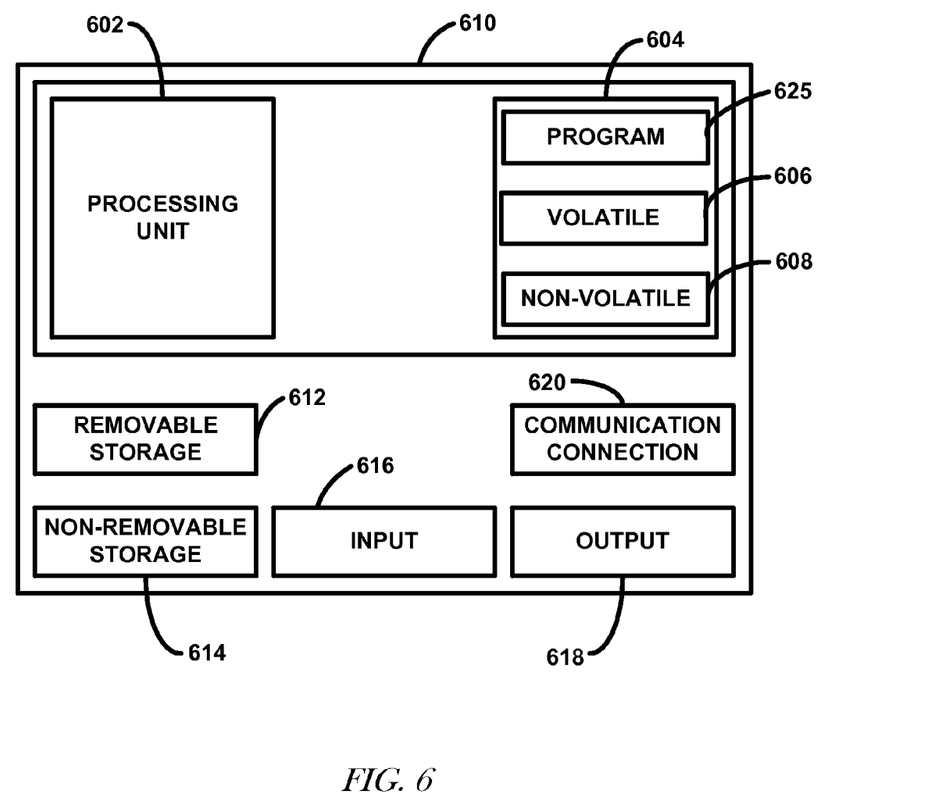
FIG. 6 is a logical block diagram of an example of a computer system.

FIG. 6 is a block diagram of a computing device, according to an example embodiment. In one or more embodiments, multiple such computer systems can be utilized in a distributed network to implement multiple components in a transaction-based environment. An object-oriented, service-oriented, or other architecture can be used to implement such functions and communicate between the multiple systems and components. An example computing device in the form of a computer 610 can include a processing unit 602, memory 604, removable storage 612, and non-removable storage 614. Memory 604 can include volatile memory 606 and non-volatile memory 608. Computer 610 can include—or have access to a computing environment that includes—a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 610 can include or have access to a computing environment that includes input 616, output 618, and a communication connection 620 that may include a communications module to communicate with mobile devices via a port coupled to a network connection such as the internet or cellular network. The computer can operate in a networked environment using a communication connection to connect to one or more remote computers, such as database servers. The remote computer can include a personal computer (PC), server, router, network PC, a peer device or other common network node, or the like. The communication connection can include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a non-transitory computer-readable medium. For example, a computer program 625 capable of performing one or more of the methods illustrated and described herein can be stored on a non-transitory computer-readable medium. An example of such a computer program can include a computer readable storage device including instructions stored thereon, the instructions, which when executed by a machine, cause the machine to perform operations including determining a first set of possible intended names as a function of a first name, determining a second set of possible intended names for each name in a set of names in a name variant database, probabilistically matching a name from the first set of possible intended names to a name from second set of possible intended names, and wherein probabilistically matching includes determining a probability of a first user typing the first name but intending to type another name in the first set of possible intended names and determining the probability of a second user typing a name in the set of names in the name variant database but intending to type a name from the second set of possible intended names.

Additional Notes and Examples

In Example 1 a method includes determining a first set of possible intended names as a function of a first name, determining a second set of possible intended names for each name in a set of names in a name variant database, and probabilistically matching a name from the first set of possible intended names to a name from the second set of possible intended names.

In Example 2, probabilistically matching of Example 1 includes determining a weight associated with typing the first name but intending to type another name in the first set of possible intended names and determining the probability of typing a name in the set of names in the name variant database but intending to type a name from the second set of possible intended names.

In Example 3, determining the probability of typing the second name but intending to type another name in the second set of possible intended names of at least one of Examples 1-2 includes using a hidden Markov model to model a cognitive and transcription error process associated with typing the second name.

In Example 4, determining the second set of possible intended names for each name in the set of names in the name variant database of at least one of Examples 1-3 includes using multiple string alignment to at least partially determine the second set of possible intended names.

In Example 5, determining the first set of possible intended names of at least one of Examples 1-4 includes using a phonetic matching algorithm to determine names phonetically similar to the first name.

In Example 6, the method of at least one of Examples 1-5 includes ranking possible matches between the first name and an intended name in the second set of possible intended names by, at least in part, determining a probability of an intersection between the first set of possible intended names and a third set of possible names phonetically similar to the intended name.

In Example 7, determining the probability of the intersection of at least one of Examples 1-6 includes summing a joint probability of a conditional probability of the first name given the intended name, a conditional probability of a name from the second set of possible intended names given the intended name, and the unconditional probability of the intended name.

In Example 8, the method of at least one of Examples 1-7 includes filtering the names phonetically similar to the first name to remove gender specific names of a gender opposite a gender of the first name.

In Example 9, a system includes a database including (1) a first set of possible intended names produced as a function of a first name and (2) a second set of possible intended names for each name in a set of names, and a probabilistic matching module, executable by one or more processors, configured to match a name from the first set of possible intended names to a name from the second set of possible intended names, determine a weight of typing the first name but intending to type another name in the first set of possible intended names, and determine a probability of typing a name in the set of names but intending to type a name from the second set of possible intended names.

In Example 10, the system of at least one of Examples 1-9 includes a hidden Markov module configured to use a hidden Markov model to model a cognitive and transcription error process associated with a user typing the second name to determine the probability.

In Example 11, the system of at least one of Examples 1-10 includes a name expansions module configured to use multiple string alignment to at least partially determine the second set of possible intended names.

In Example 12, the system of at least one of Examples 1-11 includes a phonetically similar name generator module configured to receive the first name and produce the first set of possible intended names as a function of the first name.

In Example 13, the probabilistic matching module of at least one of Examples 1-12 is configured to determine a rank for an intended name in the second set of possible intended names by at least in part, determining a probability of an intersection between the first set of possible intended names and a third set of possible names phonetically similar to the intended name.

In Example 14, the probabilistic matching module of at least one of Examples 1-13 is configured to sum a joint probability of a conditional probability of the first name given the intended name, a conditional probability of a name from the second set of possible intended names given the intended name, and the unconditional probability of the intended name.

In Example 15, the system of at least one of Examples 1-14 includes a string similarity module configured to filter the names phonetically similar to the first name to remove names not sufficiently similar to the received word.

In Example 16, a computer readable storage device includes instructions stored thereon, the instructions, which when executed by a machine, cause the machine to perform operations including determining a first set of possible intended names as a function of a first name, determining a second set of possible intended names for each name in a set of names in a name variant database, and probabilistically matching a name from the first set of possible intended names to a name from second set of possible intended names.

In Example 17, probabilistically matching of at least one of Examples 1-16 includes determining a weight of typing the first name but intending to type another name in the first set of possible intended names and determining the probability of typing a name in the set of names in the name variant database but intending to type a name from the second set of possible intended names.

In Example 18, the instructions for determining the probability of typing the second name but intending to type another name in the second set of possible intended names of at least one of Examples 1-17 include instructions, which when executed by the machine cause the machine to perform operations further comprising using a hidden Markov model to model a cognitive and transcription error process associated with typing the second name.

In Example 19, the instructions for determining the second set of possible intended names for each name in the set of names in the name variant database of at least one of Examples 1-18 include instructions, which when executed by the machine cause the machine to perform operations further comprising using multiple string alignment to at least partially determine the second set of possible intended names In Example 20, the instructions for determining the first set of possible intended names of at least one of Examples 1-19 include instructions, which when executed by the machine cause the machine to perform operations including using a phonetic matching algorithm to determine names phonetically similar to the first name.

In Example 21, the storage device of at least one of Examples 1-20 includes instructions stored thereon, which when executed by the machine, cause the machine to perform operations including ranking possible matches by, at least in part, determining a probability of an intersection between the first set of possible intended names and a third set of possible names phonetically similar to an intended name from the second set of possible intended names.

In Example 22, the instructions for determining the probability of the intersection of at least one of Examples 1-21 include instructions, which when executed by the machine cause the machine to perform operations including summing a joint probability of a conditional probability of the first name given the intended name, a conditional probability of a name from the second set of possible intended names given the intended name, and the unconditional probability of the intended name.

Some embodiments implement the functions in two or more specific interconnected hardware modules or devices with related control and data signals communicated between and through the modules, or as portions of an application-specific integrated circuit. A module can include software, hardware, firmware, or a combination thereof. The module can be executable by a processor, such as to cause a machine to perform one or more operations. The process flows are applicable to software, firmware, or hardware implementations.

Systems and methods of the present disclosure may be implemented on a mobile device as a mobile application, web-based application, on a desktop computer as a computer application, or a combination thereof. A mobile application may operate on a Smartphone, tablet computer, portable digital assistant (PDA), ruggedized mobile computer, or other mobile device. The mobile device may be connected to the Internet or network via Wi-Fi, Wide Area Network (WAN), cellular connection, WiMax, or any other type of wired or wireless method of networking connection. In some embodiments, a web-based application may be delivered as a software-as-a-service (SaaS) package (e.g. cloud-based embodiments) accessible via a device app, a web browser application, or other suitable application, depending on the particular embodiment.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

It will be readily understood to those skilled in the art that various other changes in the details, material, and arrangements of the parts and method stages which have been described and illustrated in order to explain the nature of the inventive subject matter can be made without departing from the principles and scope of the inventive subject matter as expressed in the subjoined claims.

What is claimed is:

1. A method comprising:
    determining a first set of possible intended person names as a function of a first person name;
    determining a second set of possible intended person names for each person name in a set of names in a person name variant database;
    probabilistically matching a person name from the first set of possible intended person names to a person name from the second set of possible intended person names; and
    wherein probabilistically matching includes determining a weight associated with typing the first person name but intending to type another person name in the first set of possible intended person names and determining the probability of typing a person name in the set of person names in the name variant database but intending to type a person name from the second set of possible intended person names using a hidden Markov model to model a cognitive and transcription error process associated with a user typing the person name in the set of person names in the person name variant database and disambiguate entries in the person name variant database.

2. The method of claim 1, wherein determining the second set of possible intended person names for each person name in the set of person names in the person name variant database includes using multiple string alignment to at least partially determine the second set of possible intended person names.

3. The method of claim 2, wherein determining the first set of possible intended person names includes using a phonetic matching algorithm to determine person names phonetically similar to the first person name.

4. The method of claim 3, further comprising ranking possible matches between the first person name and an intended person name in the second set of possible intended person names by, at least in part, determining a probability of an intersection between the first set of possible intended person names and a third set of possible person names phonetically similar to the intended person name.

5. The method of claim 4, wherein determining the probability of the intersection includes summing a joint probability of a conditional probability of the first person name given the intended person name, a conditional probability of a person name from the second set of possible intended person names given the intended person name, and the unconditional probability of the intended person name.

6. The method of claim 5, further comprising filtering the person names phonetically similar to the first person name to remove gender specific person names of a gender opposite a gender of the first person name.

7. A system comprising:
    one or more processors;
    a database coupled to the one or more processors, the database including (1) a first set of possible intended person names produced as a function of a first person name and (2) a second set of possible intended person names for each person name in a set of person names; and
    a probabilistic matching module, executable by the one or more processors, configured to match a person name from the first set of possible intended person names to a person name from the second set of possible intended person names, determine a weight of typing the first person name but intending to type another person name in the first set of possible intended person names, and determine a probability of typing a person name in the set of person names but intending to type a person name from the second set of possible intended person names using a hidden Markov model to model a cognitive and transcription error process associated with a user typing the person name in the set of names in the database and disambiguate entries in the database.

8. The system of claim 7, further comprising a name expansions module configured to use multiple string alignment to at least partially determine the second set of possible intended person names.

9. The system of claim 8, further comprising a phonetically similar name generator module configured to receive the first person name and produce the first set of possible intended person names as a function of the first person name.

10. The system of claim 9, wherein the probabilistic matching module is further configured to determine a rank for an intended person name in the second set of possible intended person names by at least in part, determining a probability of an intersection between the first set of possible intended person names and a third set of possible names phonetically similar to the intended person name.

11. The system of claim 10, wherein the probabilistic matching module is further configured to sum a joint probability of a conditional probability of the first person name given the intended person name, a conditional probability of a person name from the second set of possible intended person names given the intended person name, and the unconditional probability of the intended person name.

12. The system of claim 11, further comprising a string similarity module configured to filter the person names phonetically similar to the first name to remove person names not sufficiently similar to the first person name.

13. A non-transitory computer readable storage device including instructions stored thereon, the instructions, which when executed by a machine, cause the machine to perform operations comprising:
   determining a first set of possible intended person names as a function of a first person name;
   determining a second set of possible intended person names for each person name in a set of names in a person name variant database;
   probabilistically matching a person name from the first set of possible intended person names to a person name from the second set of possible intended person names; and
   wherein probabilistically matching includes determining a weight of typing the first person name but intending to type another person name in the first set of possible intended person names and determining the probability of typing a person name in the set of person names in the person name variant database but intending to type a person name from the second set of possible intended person names using a hidden Markov model to model a cognitive and transcription error associated with typing the name in the set of names and disambiguate entries in the database.

14. The storage device of claim 13, wherein the instructions for determining the second set of possible intended person names for each person name in the set of person names in the person name variant database include instructions, which when executed by the machine cause the machine to perform operations further comprising using multiple string alignment to at least partially determine the second set of possible intended person names.

15. The storage device of claim 14, wherein the instructions for determining the first set of possible intended person names include instructions, which when executed by the machine cause the machine to perform operations further comprising using a phonetic matching algorithm to determine person names phonetically similar to the first person name.

16. The storage device of claim 15, further comprising instructions stored thereon, which when executed by the machine, cause the machine to perform operations, further comprising:
   ranking possible matches by, at least in part, determining a probability of an intersection between the first set of possible intended person names and a third set of possible person names phonetically similar to an intended name from the second set of possible intended person names.

17. The storage device of claim 16, wherein the instructions for determining the probability of the intersection include instructions, which when executed by the machine cause the machine to perform operations further comprising summing a joint probability of a conditional probability of the first person name given the intended person name, a conditional probability of a person name from the second set of possible intended person names given the intended person name, and the unconditional probability of the intended person name.

* * * * *